United States Patent
Nickel et al.

(10) Patent No.: US 9,769,023 B2
(45) Date of Patent: Sep. 19, 2017

(54) METHOD FOR MONITORING A COMMUNICATION NETWORK

(71) Applicant: Robert Bosch GmbH, Stuttgart (DE)

(72) Inventors: Patrick Nickel, Birstein (DE); Ralf Feil, Ludwigsburg (DE); Ralf Machauer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 54 days.

(21) Appl. No.: 14/638,846

(22) Filed: Mar. 4, 2015

(65) Prior Publication Data

US 2015/0256398 A1 Sep. 10, 2015

(30) Foreign Application Priority Data

Mar. 5, 2014 (DE) .......... 10 2014 204 033

(51) Int. Cl.
| | | |
|---|---|---|
| *H04L 12/24* | (2006.01) | |
| *H04L 25/02* | (2006.01) | |
| *H04L 12/26* | (2006.01) | |
| *H04L 12/417* | (2006.01) | |
| *H04L 12/40* | (2006.01) | |

(52) U.S. Cl.
CPC ........ *H04L 41/0853* (2013.01); *H04L 12/417* (2013.01); *H04L 25/0212* (2013.01); *H04L 43/10* (2013.01); *H04L 2012/40215* (2013.01); *H04L 2012/40241* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 2002/0181567 | A1* | 12/2002 | Hamdi ................. | H04B 1/1027 375/222 |
| 2012/0099471 | A1* | 4/2012 | Brannstrom .......... | H04L 1/0026 370/252 |
| 2014/0023132 | A1* | 1/2014 | Pandey ............. | H04L 25/03006 375/232 |
| 2014/0044212 | A1* | 2/2014 | Menzel ................ | H04B 5/0043 375/285 |
| 2014/0119381 | A1* | 5/2014 | Diab ....................... | H04L 12/40 370/431 |
| 2015/0237513 | A1* | 8/2015 | Garrett ................ | H04L 25/0224 370/252 |
| 2016/0149612 | A1* | 5/2016 | Julson ..................... | H04B 3/46 375/224 |

* cited by examiner

*Primary Examiner* — Hicham Foud
(74) *Attorney, Agent, or Firm* — Norton Rose Fulbright US LLP; Gerard Messina

(57) ABSTRACT

A method for monitoring a communication network, which includes a plurality of processing units which communicate with one another via a communication medium, a channel of the communication medium being measured using channel estimation; from a result of the channel estimation, a characteristic variable being produced; and, with the aid of the characteristic variable, a decision is made as to whether a manipulative change of the communication network has occurred.

10 Claims, 1 Drawing Sheet

METHOD FOR MONITORING A COMMUNICATION NETWORK

RELATED APPLICATION INFORMATION

The present application claims priority to and the benefit of German patent application no. 10 2014 204 033.7, which was filed in Germany on Mar. 5, 2014, the disclosure of which is incorporated herein by reference.

FIELD OF THE INVENTION

The present invention relates to a method for monitoring a communication network, especially for detecting manipulative changes.

BACKGROUND INFORMATION

In modern communication networks, particularly in motor vehicles, bus systems such as CAN, LIN or Flex Ray may be used. A plurality of control units may thereby be connected to one another. In this context, such bus systems are configured for the cost-effective transmission of signals between the control units.

To secure the transmission from errors, redundancies are fitted into the signal flow, so that corruptions may be detected on the receiver side. It is possible, however, to import messages into the bus system in a targeted manner, by connecting using a special bus node, such as a laptop having a CAN interface. Such incorporated outside messages are not detectable in the related art or only at great expenditure. Even detecting an outside control unit in the communication system is not possible.

It is therefore desirable to state a possibility of detecting a manipulative change of a communication system in a simple manner.

SUMMARY OF THE INVENTION

A method having the features of claim 1 is provided in accordance with the present invention. Advantageous refinements are the subject matter of the dependent claims and of the following description.

In a method of the present invention for monitoring a communication network which includes a plurality of processing units which communicate with one another via a communication medium, a channel of the communication medium is measured using channel estimation. For this purpose, a training sequence is sent, for example, whose data the appropriate receiver knows. The receiver is then able to calculate specific values of the channel with the aid of the change, such as the impedance or the running time which depend, for example, on the line lengths and/or reflections at the line ends. One may, however, fall back on any known channel estimating methods from messaging technology.

From a result of the channel estimation, a characteristic variable is subsequently generated, with the aid of which a decision is made as to whether a manipulative change of the communication network has occurred. For this purpose, it may be evaluated how greatly measured results of successive measurements differ from one another. For instance, deviations of transmitted pulse responses or transmission functions may be observed. In an additional processing unit, the reflective behavior of signals changes for example. Similarly, additional lines change the behavior of signals or their pulse response. For this, no additional logical data channels or additional bandwidth are required.

The generation of the characteristic variable may include a comparison of the results of the channel estimation to a reference value, the reference value being determined initially or at predetermined intervals. The comparison takes place particularly using correlation, at which a temporal structure of the signal is observed and at which sequences of the signal are able to be compared to one another, which may also be very similar at different points in time. Deeper knowledge of signals is not necessary for this. A comparison to the reference value may also be produced via a correlation coefficient. Furthermore, classifiers would also be conceivable, which one might adapt to usual signal shapes. Such a determination of a reference value may particularly be carried out as a channel estimation, the result being used as reference value to which a current result of a channel estimation is then compared and correlated. Thereby deliberate and/or predictable changes in the communication network may also be taken into account.

The channel estimation is advantageously carried out cyclically or at irregular intervals. This makes possible continuous monitoring for possible manipulations on the communication network.

It is advantageous if, in the decision of whether there has been a manipulative change of the communication network, a change conditioned upon aging is taken into account. Changes conditioned upon aging are very slow processes, that is, by slow tracking of the reference value of the channel, aging processes may be caught. A great change in successive measurements indicates a manipulation, whereas small deviations are to be disregarded. If these small changes are present over a longer time period, the reference value should be correspondingly changed or slowly adapted (adaptation). There is also the possibility of prediction, i.e. changes may be predicted with the aid of aging models, and these may also be taken into account. Thereby a degradation of the communication medium which, at least to a certain extent, is predictable may be taken into account.

The channel estimation may be carried out centrally by one of the processing units using the sending of a measurement message and the evaluation of a pulse response to the measurement message. This makes possible a cost-effective limitation to one processing unit. In addition, the monitoring processing unit is able to assess, while sending, the representation of the measurement message including reflections that are occurring.

Alternatively, the channel estimation is carried out in that a measurement message is sent by a processing unit and is evaluated by at least one other processing unit. In particular, in this instance, a plurality of processing units may also send measurement messages, particularly also in opposite directions. With that, the quality of the detection of manipulations may be improved, since the physical communication medium may contain regions which have effects only in one direction.

It is also advantageous if the decision is recorded. Such a recording may take place in a storage area especially provided for this. This enables the preservation of evidence in that possible manipulations are able to be understood.

The channel estimation is advantageously used for a transmission path between two processing units to encode messages between these two processing units. Since a pulse response, on a path between two processing units, in both directions at comparable boundary conditions is at least approximately equal and specific to the two processing units, this pulse response, which results from the channel estimation, is able to be used to encode messages. In this way, manipulations may also be detected, since the pulse response does not match during the sending of the corresponding message from another processing unit.

A method according to the present invention may be used in a communication network in which the communication medium is developed as a bus, particularly an automotive Ethernet, a CAN or a FlexRay. This is the normal use, especially in a motor vehicle.

A processing unit according to the present invention, such as a control unit of a motor vehicle, is equipped, particularly in a program technology manner, to carry out a method according to the present invention.

The implementation of the method in the form of software is also advantageous, since this incurs particularly low costs, especially if an executing control unit is also used for additional tasks and is therefore present anyway. Suitable data carriers for providing the computer program are, in particular, diskettes, hard disks, flash memories, EEPROMs, CD-ROMs, DVDs etc. A download of a program via computer networks (Internet, intranet, etc.) is also possible Further advantages and developments of the present invention derive from the description and the accompanying drawing.

It is understood that the features mentioned above and the features yet to be described below may be used not only in the combination given in each case but also in other combinations or individually, without departing from the scope of the present invention.

The present invention is represented schematically in the drawing in light of an exemplary embodiment, and is described in detail below with reference to the drawing.

DETAILED DESCRIPTION

Figure 1:
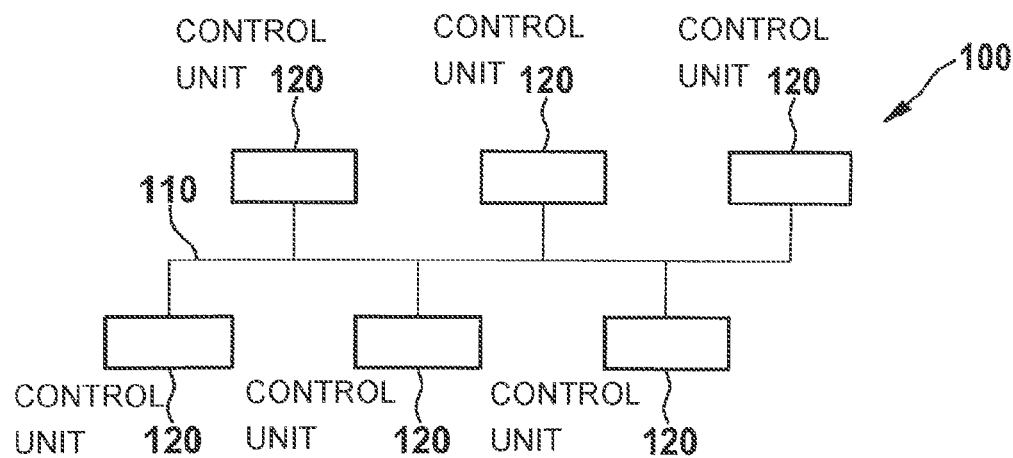
FIG. 1 schematically shows a communication network for a method according to the present invention may be used in an exemplary embodiment.

A communication network 100 is schematically shown in FIG. 1. The communication network includes a plurality of processing units developed as control units 120, which are connected via a communication medium developed as a bus 110, and communicate over it. An automotive Ethernet, a CAN or FlexRay, for example, come into consideration as a bus, particularly for use in motor vehicles. A method according to the present invention is able to be used in such a communication network 100.

Figure 2:
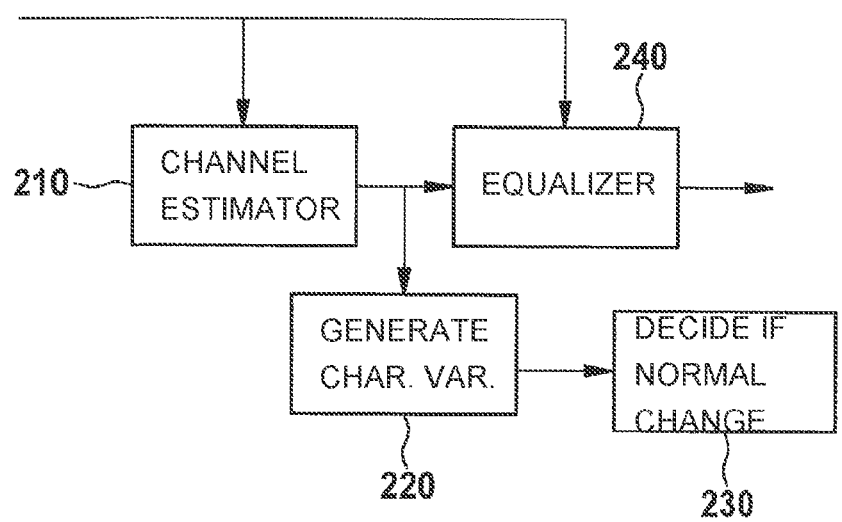
FIG. 2 schematically shows the sequence of a method according to the present invention in an exemplary embodiment.

FIG. 2 schematically shows the sequence of a method of the present invention in an exemplary embodiment. In the following text, the method according to the present invention is shown generally, with reference to FIGS. 1 and 2.

In one embodiment, a channel estimation is first centrally carried out by a control unit 120. In this instance, a channel is measured via which data are transmitted between control units 120.

Using a feature extraction, a characteristic variable 220 is generated from a result of the channel estimation, using which it may be decided whether the channel has changed significantly. This is able to take place, for instance, via a correlation or a comparison of the current channel estimation 210 to a reference measurement or a reference value.

A reference measurement may be, for example, a channel estimation carried out initially, i.e. at the time of initial operation of the communication network, for determining the essential characteristics of the communication network. Such characteristics are, for example, a channel pulse response of the channel, a number of echoes, a pulse response length, a level value curve, transmission functions or impedances. It is also conceivable that one might calculate a reference value from the infrastructure, that is present, of communication network 100.

Thereafter a decision 230 is made as to whether a detected channel change is a normal channel change or whether a manipulation or a manipulation attempt are present. A normal channel change includes, for instance, statistical or temperature-conditioned fluctuations of the measured values. Mechanical effects caused by changes in the geometry of the wiring harness or individual cables, for example, may also be included. A channel change conditioned upon aging, based on degradation of the channel may, however, be taken into account during the generation of characteristic variable 220.

The channel estimation carried out centrally by a control unit 120 has the advantage that the monitoring entity, i.e. monitoring control unit 120, while sending a measurement message for the channel estimation, knows the exact representation of this message, and is therefore able exactly to assess the pulse response to the message, including reflections that occur in the communication medium.

The monitoring of the communication network by a channel estimation having a subsequent generation of a characteristic variable, and making a decision, is continuously able to take place during the operation of the communication network by cyclically sent measurement messages. In addition or alternatively, measurement messages at irregular intervals are also conceivable.

In one further embodiment, channel estimation 210 is subdivided onto a plurality of control units 120. For this purpose, a measurement message, for instance, in the form of a co-called training sequence, is sent by one control unit and received and evaluated by another control unit. In particular, the sending and receiving of the measurement message may take place reciprocally between control units. A plurality of control units may likewise send measurement messages which are received by other control unit.

This is able to increase the quality of the detection of a possible manipulation of the communication network, since the physical communication medium may, for instance, have regions on certain connecting paths which are in one direction "invisible" for the channel estimation, this means that possible changes in the communication network are not able to be detected in this region. In the opposite direction, on the other hand, the changes are indeed detectable.

If a region is "illuminated" from only one direction and observed from only one direction (at the same or at another place), there are covered or shaded regions which are poorly detectable. By using different directions for illuminating and for observing, the quality is clearly increased. In one circuit (in this case: bus cable) there are parts which more or less influence the properties of the circuit. The influencing in this case does not depend only on the location of the acting upon the (circuit) network, but also on from which side this influencing is observed and measured. In one active measurement, a signal is inserted, so that, in the design, several combinations come about of dropping and inserting location.

The generation of characteristic variable 220 may then, for instance, take place for each control unit which is evaluating a measurement message. Consequently, a possible manipulation of different control units may be detected.

In one further embodiment, the channel estimation is used for generating code sequences for encoding messages. Pulse responses to a message, on a path between two control units, at comparable boundary conditions, have a strong similarity in opposite directions. This pulse response may thus be used for identifying one control unit as opposed to another control unit. This enables the use of a pulse response as a code which is known only to the two respective control units.

A method according to the present invention may be used particularly for communication networks which already have an equalization 240. By an equalization 240, distortions created during the transmission of messages and/or signals via the communication medium by reflections, for example, are reduced. This is particularly advantageous, since the equalization usually always works with a channel estimation anyway. A signal is interfered with and/or changed on the transmission path through the transmission channel, both in intensity and in temporal width. The equalizer estimates the changes which come about on the transmission path, using channel estimation and then calculates them out again on the receiving side.

What is claimed is:

1. A method for monitoring a communication network in a motor vehicle, which includes a plurality of processing units which communicate with one another via a communication bus, the method comprising:
   measuring a channel of the communication bus using channel estimation, wherein the processing units are configured as control units, which are connected via the communication bus for providing communication over the bus, and wherein the channel is measured via which data are transmitted between the control units;
   generating, via at least one of the processing units, from a result of the channel estimation, a characteristic variable; and
   determining, via at least one of the processing units, with the aid of the characteristic variable, a decision as to whether a manipulative change of the communication network has occurred, so as to detect and record an outside control unit in the communication network of the motor vehicle;
   wherein the generation of the characteristic variable includes comparing the results of the channel estimation to a reference value, and
   wherein the communication bus includes one of an automotive Ethernet, a controller area network (CAN) bus, and a FlexRay bus.

2. The method of claim 1, wherein the channel estimation is carried out at least one of cyclically and at irregular intervals.

3. The method of claim 1, wherein the reference value is determined at least one of initially and at predetermined intervals.

4. The method of claim 1, wherein in the decision a change conditioned upon aging of the channel is taken into account.

5. The method of claim 1, wherein the channel estimation is carried out centrally by one of the processing units using the sending of a measurement message and the evaluation of a pulse response to the measurement message.

6. The method of claim 1, wherein the channel estimation is carried out in that a measurement message is sent by a processing unit and is evaluated by at least one other processing unit.

7. The method of claim 1, wherein the channel estimation is used for a transmission path between two processing units to encode messages between these two processing units.

8. The method of claim 1, wherein the reference value is adapted to account for aging, which produces small changes in successive measurements that are large enough to represent a manipulative change, by actual measurements or by a predictive model.

9. A non-transitory computer readable medium having a computer program, which is executable by a processor, comprising:
   program code of the computer program for monitoring a communication network in a motor vehicle, the communication network including a plurality of processing units which communicate with one another via a communication bus, by performing the following:
   measuring, via at least one of the processing units, a channel of the communication bus using channel estimation, wherein the processing units are configured as control units, which are connected via the communication bus for providing communication over the bus, and wherein the channel is measured via which data are transmitted between the control units;
   generating, via at least one of the processing units, from a result of the channel estimation, a characteristic variable; and
   determining, via at least one of the processing units, with the aid of the characteristic variable, a decision as to whether a manipulative change of the communication network has occurred, so as to detect and record an outside control unit in the communication network of the motor vehicle;
   wherein the generation of the characteristic variable includes comparing the results of the channel estimation to a reference value, and
   wherein the communication bus includes one of an automotive Ethernet, a controller area network (CAN) bus, and a FlexRay bus.

10. The computer readable medium of claim 9, wherein the reference value is adapted to account for aging, which produces small changes in successive measurements that are large enough to represent a manipulative change, by actual measurements or by a predictive model.

* * * * *